(12) United States Patent
Shiraishi (10) Patent No.: US 7,656,450 B2
(45) Date of Patent: Feb. 2, 2010

(54) IMAGE CAPTURE APPARATUS WHICH SETS A SUBSTRATE BIAS VOLTAGE OF AN IMAGE SENSOR

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 10/991,503

(22) Filed: Nov. 19, 2004

(65) Prior Publication Data

US 2005/0151874 A1    Jul. 14, 2005

(30) Foreign Application Priority Data

Nov. 19, 2003    (JP) ............................. 2003-388653

(51) Int. Cl.
- *H04N 3/14* (2006.01)
- *H04N 5/335* (2006.01)
- *H04N 5/232* (2006.01)
- *G03B 13/00* (2006.01)

(52) U.S. Cl. ....................... 348/311; 348/345
(58) Field of Classification Search .................. 348/311
See application file for complete search history.

(56) References Cited

U.S. PATENT DOCUMENTS 5,857,122 A * 1/1999 Miyamoto et al. ............ 396/55

| 6,559,889 | B2 * | 5/2003 | Tanaka et al. ............... 348/299 |
| 2003/0086005 | A1 * | 5/2003 | Nakamura ............... 348/223.1 |
| 2004/0239790 | A1 * | 12/2004 | Maeda et al. ............... 348/311 |

FOREIGN PATENT DOCUMENTS

| JP | 05-103273 | 4/1993 |
| JP | 2001-177774 | 6/2001 |

* cited by examiner

*Primary Examiner*—Tuan Ho
*Assistant Examiner*—Chia-Wei A Chen
(74) *Attorney, Agent, or Firm*—Oblon, Spivak, McClelland, Maier & Neustadt, L.L.P.

(57) ABSTRACT

An image-pickup apparatus provided with an auto-focus capability. A first unit is configured to input a first trigger signal to initiate a distance measuring operation. A second unit is configured to input a second trigger signal to initiate a photographing operation. A setting unit is configured to set a substrate bias voltage applied to an imaging device included in the image-pickup apparatus. The setting unit is configured to set the substrate bias voltage one of during and after an auto-focus operation when the second trigger signal is input before expiration of a predetermined period of time after inputting the first trigger signal.

10 Claims, 3 Drawing Sheets

IMAGE CAPTURE APPARATUS WHICH SETS A SUBSTRATE BIAS VOLTAGE OF AN IMAGE SENSOR

CROSS REFERENCE TO RELATED APPLICATIONS

This application claims priority to Japanese application no. 2003-388653, filed on Nov. 19, 2003, the disclosure of which is incorporated by reference herein in its entirety.

BACKGROUND OF THE INVENTION

1. Field of the Invention

The invention relates to an image-pickup apparatus, method and computer readable recording medium.

2. Discussion of the Related Art

Electric digital camera technology has recently become increasingly popular. In this form of technology, an image is normally imaged by a CCD array. Subsequently, the images are stored on the camera in storage media such as a semiconductor memory array. At a later stage, the images are downloaded from the CCD device to a computer or other similar device, in which they are subjected to subsequent manipulation and printing in the course of requirements.

In a digital camera the preparation for photographing images (or capturing images) has previously been initiated from the time of inputting a release signal as an instruction signal for the photographing.

There included during preparatory process are several steps such as setting a bias voltage applied to a CCD device and preparing for outputting a voice output, some of which take a relatively long time before suitably stabilized as to become fully operative. This may result in a prolonged release time lag in proportion to the time length of the preparatory waiting period.

Such a difficulty can be obviated for example by applying a bias voltage applied to CCD substrate prior to photographing so that the time lag is eliminated.

This method, however, may result in a drawback of degrading image qualities from the so-called "blooming effect" which is caused by electric charges spilled out to surrounding pixels in CCD device when a high-luminance object is present in the field of view to be photographed.

In another case when voice output means is put always on, the time lag can also be reduced. This may cause, however, a further drawback of the increase in power consumption caused by continuous turning on of the circuit, which also affects battery life.

In regard to the application of voltage to a CCD device, a circuit has previously disclosed in Japanese Laid-Open Patent Application No. 2001-177774 for changing promptly the bias voltage applied to the CCD device. Even by the method described in that application, however, the change of bias voltage generally takes a relatively long time.

Therefore, when the steps of changing the bias voltage are implemented following the photographing, the release time lag is prolonged in proportion to the time corresponding to the waiting period needed for stabilizing the bias circuit voltage.

In contrast to the '774 application, the present invention discloses a method of reducing the release time lag by initiating bias voltage setting steps under predetermined conditions prior to the photographing, which will be descried below.

In addition, although another circuit has been disclosed in Japanese Laid-Open Patent Application No. 05-103273 for promptly changing CCD bias voltages, the method in accordance with the present invention is also different from this application '273.

It is therefore desirable to provide methods of obviating previous difficulties noted earlier.

Difficulties have persisted such as unduly prolonged release time lag in proportion to time required for the setting of CCD bias voltage or for preparing suitable voice output process, the degradation of image qualities, which is caused by the above-mentioned blooming effect when a high-luminance object is present in the field of view to be photographed, and the increase in power consumption during preparatory steps of voice output.

SUMMARY OF THE INVENTION

The present invention provides an image-pickup apparatus provided with an auto-focus capability. A first unit is configured to input a first trigger signal to initiate a distance measuring operation. A second unit is configured to input a second trigger signal to initiate a photographing operation. A setting unit is configured to set a substrate bias voltage applied to an imaging device included in the image-pickup apparatus. The setting unit is configured to set the substrate bias voltage one of during and after an auto-focus operation when the second trigger signal is input before expiration of a predetermined period of time after inputting the first trigger signal.

The present invention further provides a voice output unit configured to perform a voice output on photographing an image by the image-pickup apparatus. The voice output unit is configured to perform the voice output one of during and after an auto-focus operation when the second trigger signal is input before expiration of a predetermined period of time after inputting the first trigger signal.

The present invention still further provides a setting unit configured to set a substrate bias voltage applied to an imaging device included in the image-pickup apparatus. The setting unit is configured to set the substrate bias voltage after completing an auto-focus operation when the second trigger signal is not input during a predetermined period of time after inputting the first trigger signal.

The present invention still further provides a voice output unit configured to perform a voice output on photographing an image by the image-pickup apparatus. The voice output unit is configured to perform the voice output after completing an auto-focus operation when the second trigger signal is not input during a predetermined period of time after inputting the first trigger signal.

The present invention also provides a method of photographing images by an image-pickup apparatus provided with an auto-focus capability, including receiving a first trigger signal for initiating a distance measuring operation, receiving a second trigger signal for initiating a photographing operation, and setting a substrate bias voltage applied to an imaging device of the image-pickup apparatus. The substrate voltage is set one of during and after an auto-focus operation when the second trigger signal is received prior to expiration of a predetermined period of time after receiving the first trigger signal.

The present invention further provides performing a voice output on photographing an image by the image-pickup apparatus. The voice output is performed one of during and after an auto-focus operation when the second trigger signal is received prior to expiration of a predetermined period of time after receiving the first trigger signal.

The present invention still further provides setting a substrate bias voltage applied to an imaging device included in the image-pickup apparatus. The substrate bias voltage is set after completing an auto-focus operation when the second trigger signal is not received during a predetermined period of time after receiving the first trigger signal.

The present invention still further provides providing a unit configured to perform a voice output on photographing an image by the image-pickup apparatus. The voice output is performed after completing an auto-focus operation when the second trigger signal is not received during a predetermined period of time after receiving the first trigger signal.

BRIEF DESCRIPTION OF THE DRAWINGS

In the following drawings, like references numerals will be used to refer to like elements in the various drawings, in which.

DESCRIPTION OF THE PREFERRED EMBODIMENTS

In the detailed description which follows, specific embodiments of an image-pickup apparatus and method are described, which are capable of obviating previous drawbacks such as, for example, unduly prolonged release time lag.

It is understood, however, that the present disclosure is not limited to these embodiments. For example, it is to be understood that the use of the image-pickup apparatus and several units included therein may also be adaptable to any form of imaging systems. Other embodiments will be apparent to those skilled in the art upon reading the following description.

Figure 2:
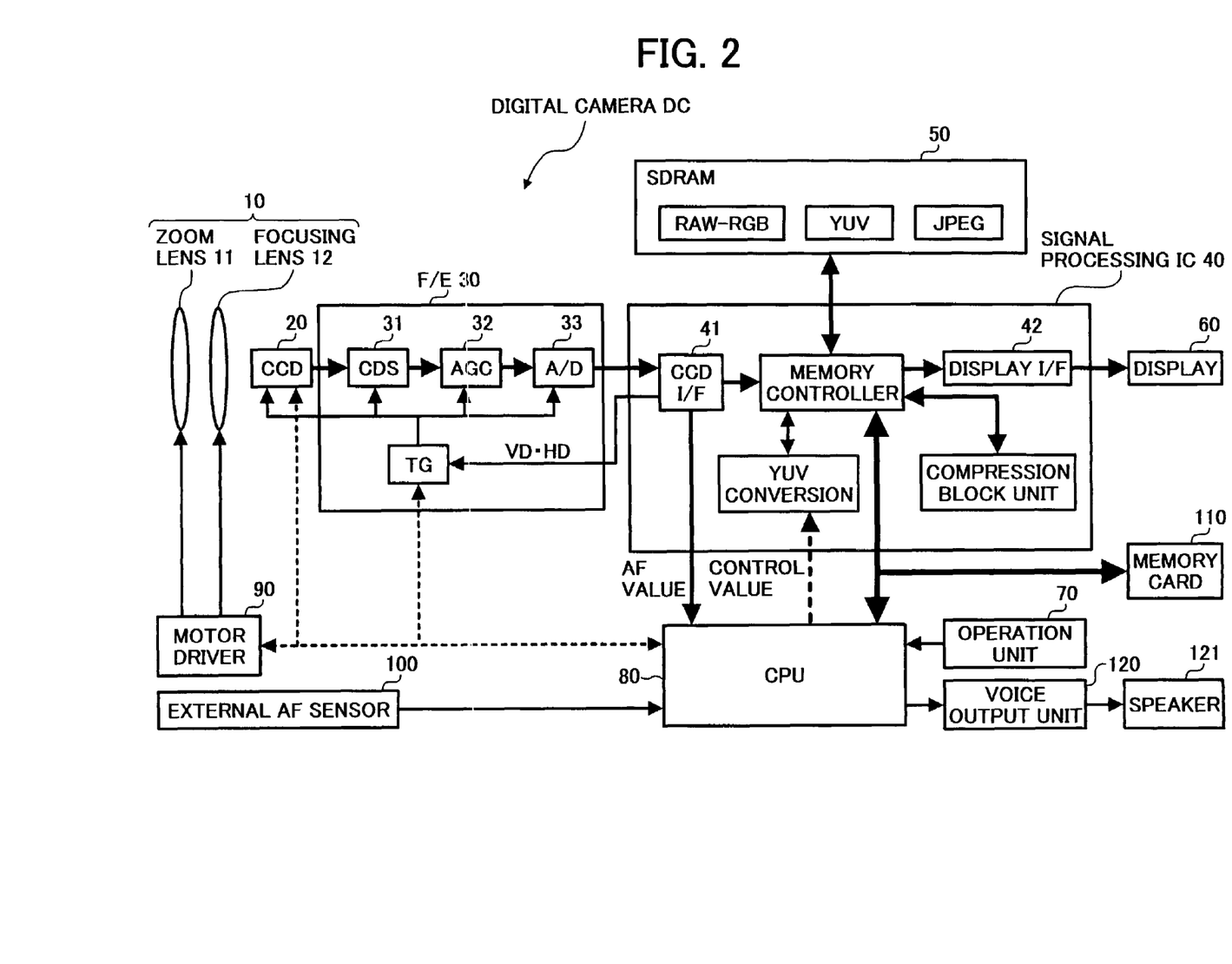
FIG. 2 is a block diagram showing connections among components of the digital camera.
Figure 3:
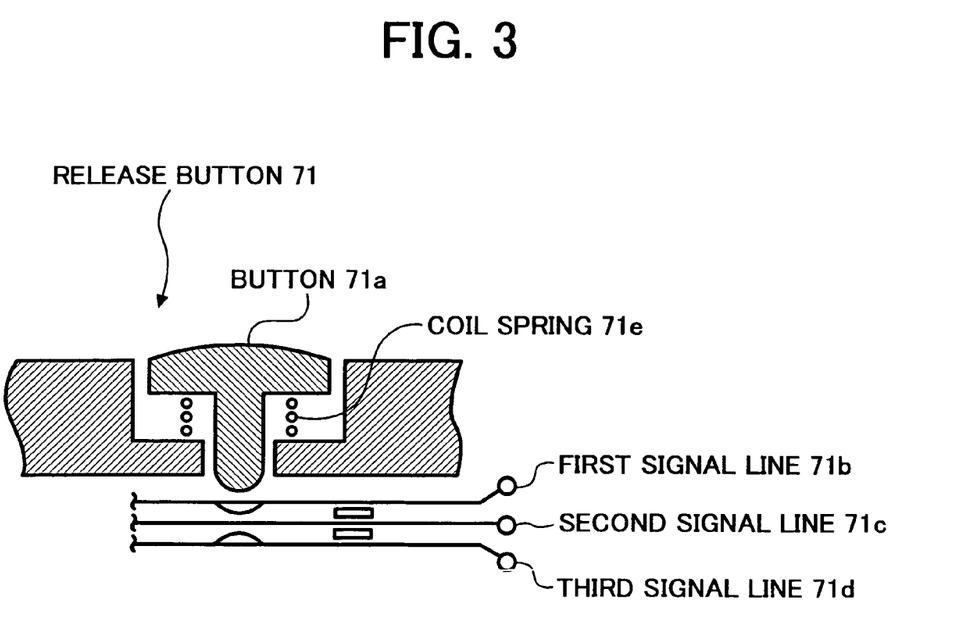
FIG. 3 is a section view showing the structure of a release button included in the digital camera.

Referring to FIGS. 2 and 3, an image-pickup apparatus is provided with at least an auto-focus capability in accordance with a first embodiment of the invention. The apparatus includes first means for inputting a first signal as the trigger for initiating a distance measuring, or auto focus, operation (that is, for establishing the connection between a first signal line 71b and a second signal line 71c of FIG. 3), second means for inputting a second signal as the further trigger for initiating a photographing operation (for establishing the connection between the second signal line 71c and a third signal line 71d), and setting means (CPU 80) for setting a substrate bias voltage applied to an imaging device included in the image-pickup apparatus. When the input from the second signal input means is input earlier than a predetermined period of time (i.e., prior to an expiration of the predetermined period of time) after inputting the first trigger signal in the first signal input means, the image-pickup apparatus is configured to perform the setting of a substrate bias voltage during or after an auto-focus operation by the setting means.

Operation of the image-pickup apparatus is described when respective instructions are input simultaneously for initiating auto-focus operation (a first-step release, i.e., turning on the first signal inputting means) and image photographing operation (a second-step release, i.e., turning on the second signal inputting means).

The imaging device CCD (charge coupled device) 20 included in the image-pickup apparatus is configured to increase electric charges accumulated in each pixel by changing a substrate bias voltage at the time of still image (static image) exposure in contrast to the monitoring period prior to photographing images.

The operation of increasing the bias voltage is performed during the still image exposure. This measure is taken because the blooming effect is caused by electric charges spilled out to surrounding pixels from a high-luminance region when the increase in the bias voltage is implemented during the monitoring period. The blooming effect is known considerably to affect the image qualities in general.

Since the change of the substrate voltage can take a relatively long time before suitably stabilized as to become fully operative after setting a target level of the voltage, a prolonged release time lag results in proportion to the time length of the preparatory waiting period when the voltage setting can be performed immediately before the image-pickup.

For purposes of comparison, the sequence of previously known steps is described below in the similar case when the instructions, "a first-step release" and "a second-step release," are input simultaneously.

An auto-focus operation is performed upon detecting an input of a first-step release. In the case of ascending AF (auto-focus) operation, an auto-focus point scan is implemented to search a point of the maximum image contrast in the course of the movement of focusing lens 12 from the closest focal point to the point of the focal length, and the focusing lens 12 is subsequently displaced to the point of the maximum contrast after the focal point scan.

When the instruction "second-step release" is already input at or before the completion of lens displacement, the process proceeds to set the change of substrate bias voltage and, upon the stabilization of the substrate voltage, to implement static image exposure.

By contrast, the process steps in accordance with the present invention are different from the above-discussed known steps.

When the instructions of "first-step release" and "second-step release" are input simultaneously, the step of setting the substrate bias voltage change is initiated at the time of the completion of lens displacement so that the exposure step can be performed right after the auto-focus operation.

As a result, the release time lag due to the waiting period for bias voltage stabilization can be eliminated when the time needed for focus lens movement is longer than the bias stabilization period, while the release time lag can still be reduced when the time for focus lens movement is shorter than the bias stabilization period.

In addition, the predetermined period of time in the present embodiment may be taken to be equal to, or earlier than the time of the completion of lens displacement. When "second-step release" is already input at that time, the process proceeds, upon the completion of auto-focus operation, to the steps of substrate bias voltage change and photographing still image.

It should be noted the setting of CCD bias voltage is performed after the auto-focus operation for the reason that the ascending AF operation may suffer from a malfunction caused by the blooming effect during the auto-focus point scan.

In accordance with a second embodiment disclosed herein, an image-pickup apparatus with at least an auto-focus capability is provided, including first means for inputting a first signal as the trigger for initiating a distance measuring operation (for establishing the connection between the first signal line 71b and second signal line 71c of FIG. 3), second means for inputting a second signal as the further trigger for initiating a photographing operation (for establishing the connection between the second signal line 71*c* and a third signal line 71*d*), and voice output means for performing a voice output (a voice output unit 120 and a speaker unit 121) upon photographing an image by the image-pickup apparatus, in which, in a case when the second trigger signal is input earlier than a predetermined period of time after inputting the first trigger signal, the image-pickup apparatus is configured to perform the setting of voice output operation by the voice output means during or after an auto-focus operation.

In reference to FIGS. 2 and 3, the process steps of the voice output means (voice output unit 120 and speaker unit 121) in the present embodiment are performed by replacing the steps of CCD bias voltage setting described earlier in the first embodiment. The voice output means is performed, for example, by means of beep sound for notifying the execution of image-pickup operation.

It takes a certain period of time after turning the power on for the voice output unit 120 to get stabilized and fully operative in a similar manner to the CCD bias stabilization. However, if the power source for voice output unit 120 is always turned on to obviate the time needed for stabilizing its circuit voltage, this may result in the increase in power consumption.

It is therefore desirable the period of power-on for the voice output unit 120 is reduced as much as possible. However, when the power is turned on immediately before the voice output or the execution of operation as in the case of previous examples, a prolonged release time lag may result in proportion to the preparatory stabilization period for voice output unit 120.

As a result, when both the "first-step release" and "second-step release" are input simultaneously, the release time lag due to the stabilization waiting period can be reduced by turning on the voice output unit 120 during auto-focus operation.

The process steps can therefore be suitably managed without putting the voice output unit 120 always on, the reduction of power consumption can be achieved while reducing the release time lag as well.

In accordance with a third embodiment disclosed herein, an image-pickup apparatus with at least an auto-focus capability is provided, including first means for inputting a first signal as the trigger for initiating a distance measuring operation (for establishing the connection between the first signal line 71*b* and second signal line 71*c* of FIG. 3), second means for inputting a second signal as the further trigger for initiating a photographing operation (for establishing the connection between the second signal line 71*c* and third signal line 71*d*), and setting means (CPU 80) for setting a substrate bias voltage applied to an imaging device included in the image-pickup apparatus, in which, when none of the input from the second signal input means is input over a further predetermined period of time after inputting the first trigger signal, the image-pickup apparatus is configured to perform the setting of a substrate bias voltage on completing an auto-focus operation.

In reference to FIGS. 2 and 3, the process steps in the present embodiment are performed as follows.

By way of example, in the case one second has elapsed after depressing "first-step release" and the completion of process steps related thereto such as auto-focus operation, the image-pickup apparatus is configured to be decided to be in a focus-lock state and to subsequently perform a CCD bias setting.

The state of focus-lock state is one that a camera user standing ready for the right moment of photographing. Since the moment of depressing "second-step release" is therefore considered to be this very moment, the photographing operation has to be performed immediately after inputting the "second-step release."

In addition, since it is considered the composition of objects to be photographed has been determined already by that moment, there is no need of being apprehensive for incurring a mistaken shot possibly due to targeting wrong objects in inclusive of the blooming by high-luminance object.

As a result, the release time lag can be reduced by setting a suitable change of CCD bias voltage after elapsing a predetermined time without spoiling operational performance during image-pickup.

In accordance with a third embodiment disclosed herein, an image-pickup apparatus with at least an auto-focus capability is provided, including first means for inputting a first signal as the trigger for initiating a distance measuring operation (for establishing the connection between the first signal line 71*b* and second signal line 71*c* of FIG. 3), second means for inputting a second signal as the further trigger for initiating a photographing operation (for establishing the connection between the second signal line 71*c* and a third signal line 71*d*), and voice output means for performing a voice output (the voice output unit 120 and speaker unit 121) upon photographing an image by the image-pickup apparatus, in which, in a case when none of the second trigger signal is input over a further predetermined period of time after inputting the first trigger signal, a setting of voice output operation by the voice output means is performed on completing an auto-focus operation.

In reference to FIGS. 2 and 3, the process steps with the voice output means (voice output unit 120 and speaker unit 121) in the present embodiment are performed by replacing the steps of CCD bias voltage setting described earlier in the third embodiment.

As described earlier, the state of focus-lock state is one that a camera user standing ready for the right moment of shooting and the image-pickup operation has to be performed immediately after inputting the "second-step release."

Therefore, the setting of voice output operation is initiated either after elapsing a predetermined time from inputting the "first-step release" or upon the completion of process steps related thereto.

As a result, the photographing images immediately after depressing the "second-step release" becomes feasible without putting the voice output unit 120 always-on, while reducing the release time lag and power consumption as well.

In accordance with a fifth embodiment disclosed herein, the image-pickup apparatus of the third embodiment may further include detection means (CCD I/F, interface, 41 of FIG. 2) for detecting a high-luminance object in the scene to be photographed, in which, when the detection means detects the high-luminance object in the field of view, setting of substrate bias voltage by the setting means is suspended even after the further predetermined period of time.

In reference to FIGS. 2 and 3, the image-pickup apparatus of the third embodiment is improved by additionally including the high-luminance portion detection means (CCD I/F 41) such that the substrate bias setting is suspended when a high-luminance object is detected in the scene to be photographed.

The reason for adopting the above noted measure is to obviate the difficulty due to the blooming effect of observing the field of view to be photographed when a high-luminance object is present in the field.

In addition, there is a further case of the macro-mode imaging in which the verification of details of the objects prior to the photographing is essential, for which the blooming effect may be detrimental and to be prevented.

In such a specific mode of operation, the apparatus can be designed to suspend CCD bias setting operation at the focus-lock mode. And, the setting of the specific mode of operation may be designed to be accessed by way of an operation switch, for example.

In accordance with a sixth embodiment disclosed herein, the image-pickup apparatus of the fourth embodiment may further include low power mode setting means (not shown), which is provided on an operation unit 70 of FIG. 2, for setting a low power consumption mode operation of the image-pickup apparatus, in which, in a case when the low power consumption mode operation is set by the low power mode setting means, a setting of voice output operation is suspended even after the further predetermined period of time.

In reference to FIGS. 2 and 3, the image-pickup apparatus of the third embodiment is improved by additionally including the low power mode setting means such that the preparatory setting steps of voice output unit 120 by the "first-step release" is suspended when the low power consumption mode operation is set.

Although the release time lag cannot be reduced, these steps are effective for prolonging battery life.

In accordance with a seventh embodiment disclosed herein, there provided is a method of photographing images by an image-pickup apparatus with at least an auto-focus capability, including the steps of receiving a first trigger signal for initiating a distance measuring operation, receiving a second trigger signal for initiating an operation, and setting a substrate bias voltage applied to an imaging device included in the image-pickup apparatus, in which, when the second trigger signal is received in the second trigger signal receiving step earlier than a predetermined period of time after receiving the first trigger signal in the first trigger signal receiving step, the setting of substrate bias voltage in the substrate bias voltage setting step is performed during or after an auto-focus operation.

In accordance with an eighth embodiment disclosed herein, there provided is a method of photographing images by an image-pickup apparatus with at least an auto-focus capability, including the steps of receiving a first trigger signal for initiating a distance measuring operation, receiving a second trigger signal for initiating a photographing operation, and performing a voice output on photographing an image by the image-pickup apparatus, in which, when the second trigger signal is received in the second trigger signal receiving step earlier than a predetermined period of time after receiving the first trigger signal in the first trigger signal receiving step, a setting of voice output operation in the voice output performing step is performed during or after an auto-focus operation.

In accordance with a ninth embodiment disclosed herein, a method of photographing images by an image-pickup apparatus with at least an auto-focus capability is provided, including the steps of receiving a first trigger signal for initiating a distance measuring operation, receiving a second trigger signal for initiating a photographing operation, and setting a substrate bias voltage applied to an imaging device included in the image-pickup apparatus, in which, when none of the second trigger signal is received in the second trigger signal receiving step over a further predetermined period of time after receiving the first trigger signal in the first trigger signal receiving step, a setting of substrate bias voltage in the substrate bias voltage setting step is performed on completing an auto-focus operation.

In accordance with a tenth embodiment disclosed herein, a method of photographing images by an image-pickup apparatus with at least an auto-focus capability is provided, including the steps of receiving a first trigger signal for initiating a distance measuring operation, receiving a second trigger signal for initiating a photographing operation, and performing a voice output on photographing an image by the image-pickup apparatus, in which, when none of the second trigger signal is received in the second trigger signal receiving step over a further predetermined period of time after receiving the first trigger signal in the first trigger signal receiving step, a setting of voice output operation in the voice output performing step is performed on completing an auto-focus operation.

In accordance with an eleventh embodiment disclosed herein, there provided is the method of the ninth embodiment of photographing images by an image-pickup apparatus with at least an auto-focus capability, further including the step of detecting a high-luminance object in a scene to be photographed, in which, in a case when the high-luminance object is detected in the scene to be photographed in the high-luminance object detecting step, the setting of substrate bias voltage in the substrate bias voltage setting step is suspended even after an auto-focus operation.

In accordance with a twelfth embodiment disclosed herein, there provided is the method of the tenth embodiment of photographing images by an image-pickup apparatus with at least an auto-focus capability, further including the step of setting a low power consumption mode operation of the image-pickup apparatus, in which, when the low power consumption mode operation in the low power consumption mode operation setting step is set, the setting of voice output operation in the voice output performing step is suspended even after an auto-focus operation.

In accordance with a thirteenth embodiment disclosed herein, a program recording medium readable by a machine, tangibly embodying a program of instructions executable by the machine to perform method steps of photographing images recited above in any one of embodiments 7 through 11.

As a result, the process steps described in one of embodiments 7 through 11 can be stored in the program recording medium. This facilitates for the same process steps as those of the present invention to be implemented by another digital camera provided with a computer device. In addition, a program recording medium with necessary imaging steps stored therein may be placed on the market as an unbundled unit.

Having described the present invention in reference with embodiments, the following details are provided further to illustrate more specifically the embodiments of the invention.

Figure 1A:
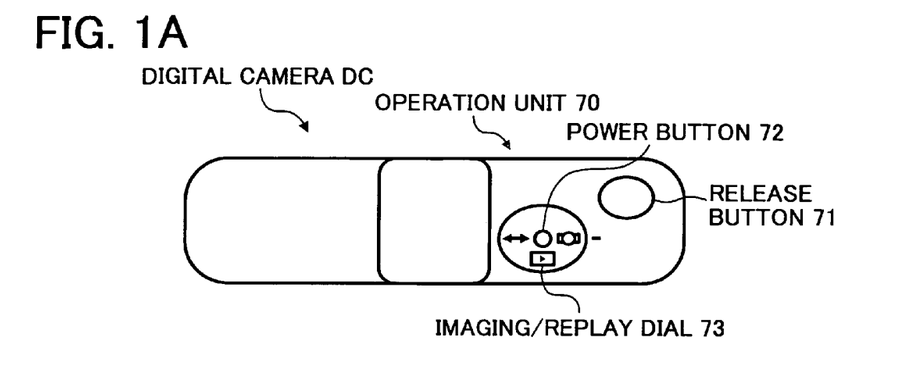
FIGS. 1A, 1B and 1C are top, elevation, and rear views, respectively, showing a digital camera according to an embodiment of the present invention.
Figure 1B:
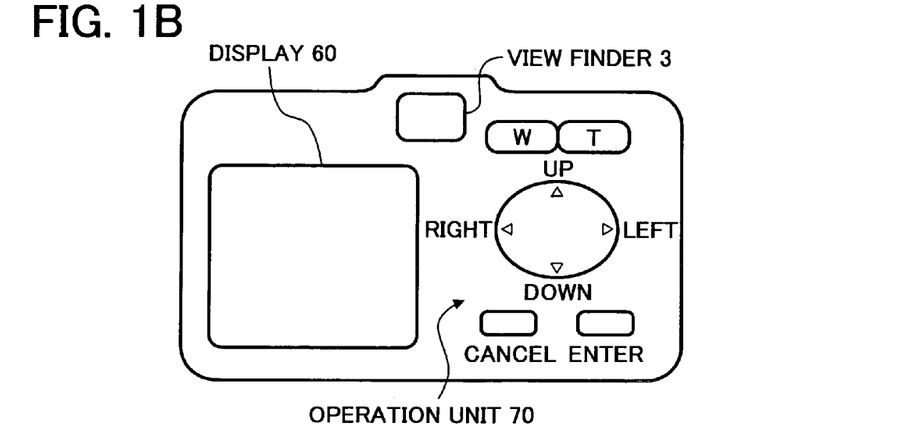
Figure 1C:
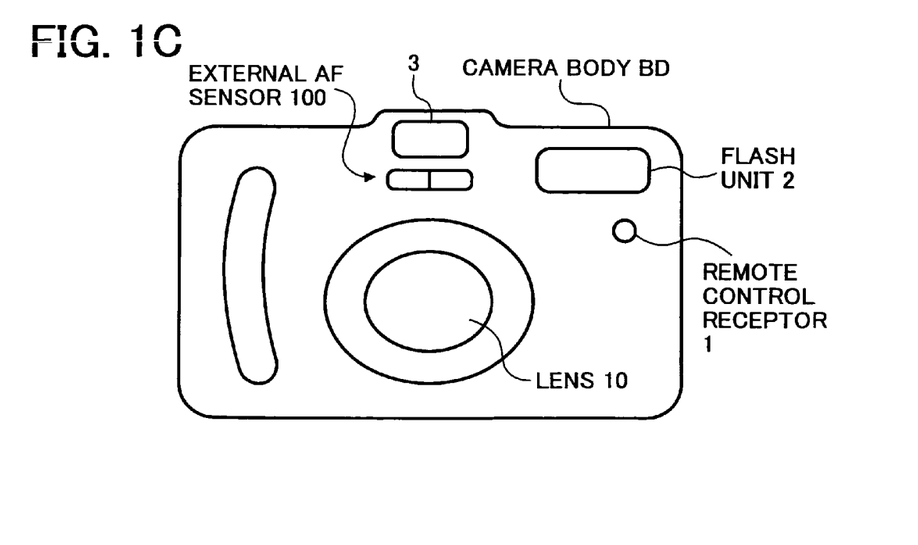

FIGS. 1A, 1B and 1C are top, elevation, and rear views, respectively, of a digital camera according to an embodiment disclosed herein.

FIG. 2 is a block diagram showing the connection in the digital camera. FIG. 3 is a section view showing the structure of a release button included in the digital camera.

Referring now to FIGS. 1A, 1B and 1C, the construction of the digital camera DC is described herein below.

There provided on the frontal face of a camera body BD (FIG. 1C) are a lens 10 at the center, a remote control receptor 1 and a flash unit 2 on the right of the lens 10, and an external AF (auto-focus) sensor 100 and a finder 3 above the lens 10.

Also provided on the rear face of the camera body BD (FIG. 1B) are a display 60 on the left and an operation unit 70 on the right.

Provided further on the upper face of the body BD (FIG. 1A) are a release button 71 of the operation unit 70, a power source button 72, and an imaging/replay dial 73.

In the next place, the construction and operation steps of the digital camera are described in reference to FIG. 2.

Upon starting the digital camera in the image-pickup mode, an image to be photographed, which is incident into through the lens 10 and focused on the surface of a CCD 20, is output as analog signals. These analog image signals are converted into digital signals by F/E (front-end unit) 30, which includes CDS (correlated double sampling), AGC (analog gain control), and A/D (analog-to-digital converter), and fed to SDRAM 50 as raw data by way of CCD-I/F 41.

The raw data are written again into signal processing IC 40, subjected to the YUV conversion, and written back to SDRAM 50. The YUV data in the SDRAM 50 are subsequently transferred to DISP I/Figure 42 to implement suitable displays with DISP 60. This serves as monitoring for the camera, which is repeatedly performed every 1/30 second until the release button is fully depressed for photographing image.

During the monitoring steps, the information only from the portion of CCD pixels is output. In the case of a CCD of three million pixels, for example, the information is transferred after thinning down to 1/6 in the horizontal scanning direction.

The triggers each for initiating the auto focus and image-pickup operations are input by way of the release button 71 (FIG. 3) provided on the operation unit 70, and detected by CPU 80.

Upon depressing a button 71a of FIG. 3, first the "first-step release" is input by establishing the connection between the first signal line 71b and second signal line 71c (that is, the aforementioned first means for inputting a first signal), and second the "second-step release" is input by establishing the connection between the second signal line 71c and third signal line 71d (that is, the second means for inputting a second signal).

In addition, a coil spring 71e serves as the member pressing the button 71a toward upward.

Upon detecting the "first-step release", the CPU 80 instructs to lock AE (automatic exposure), drive a focusing motor (not shown) included in motor driver 90 to perform an ascending AF operation, and lock the focus.

In the case when the instruction "second-step release" is already input after completing the first-step release operation, still image-pickup process steps are performed such as setting of exposure conditions based the AE results and writing the data of all exposed pixels of CCD 20 into SDRAM 50.

The data written into SDRAM 50 are subsequently subjected to the YUV conversion and the compression by the JPEG method, for example, and an image file is formed in SDRAM 50. The image file is written into a memory card 100 under the control of CPU 80.

The ascending AF steps as auto-focus operation are performed, for example, by first moving a focus lens 12 to the closest focal point, and displacing the lens thereafter little by little up to the point of the focal length.

The intensity of a monitoring image after passing a filter unit is measured all along this process so that the point of the maximum image contrast is found in the course of the movement of focus lens 12. Thereafter, the focus lens 12 is bought to the point of the maximum image contrast as the present focusing point.

In performing the still image exposure, the imaging device CCD 20 is configured to suitably change its substrate bias voltage applied to increase electric charges to be accumulated in the CCD pixels.

This bias change has to be performed, as mentioned earlier, prior to the exposure of still images, which generally takes a relatively long time such as, for example, about 30 ms before stabilized as to become fully operative after setting the target level of the voltage.

In addition, the voice output is performed, for example, with beep sound for notifying to the user that image-pickup steps have been executed for certain.

It should be noted that the voice output unit 120 including a speaker unit 121 is an analogue circuit which also takes a certain waiting period after turning the power on to get stabilized and fully operative.

It is apparent from the above description including example, the apparatuses and methods of image-pickup disclosed herein have several advantages over similar systems and methods previously known.

Improved capabilities such as reduced release time lag, excellent image formation and low power consumption are able to be achieved by means of the image-pickup apparatus and method disclosed herein.

Since these advantages have been described earlier in each section for respective embodiments, they are not repeated, while several relevant points will be supplemented herein below.

In regard to the second and eighth embodiments, it may be noted that digital cameras are in general adapted to sound voice output such as beep sound upon the start or finish of the still image exposure. Then, a user is assured to be able to move to the next movement with his/her camera.

In this case, however, a standby or power-on state of the sound output unit incurs undue power consumption, as noted earlier. It is desirable therefore to turn the power on only when necessary.

Since it takes a certain time period after turning the power on for the voice output unit 120 to get stabilized and fully operative, a prolonged release time lag may result when preparatory steps for the voice output is initiated on inputting the "second-step release" instruction.

Therefore, when both the "first-step release" and "second-step release" are input simultaneously, the release time lag due to the stabilization waiting period can be reduced by initiating preparatory steps for the voice output unit 120 as the voice output means upon detecting the inputting of the "second-step release."

In the third and ninth embodiments, there may be assumed the case when no second trigger signal is input over a predetermined period of time after inputting the "first-step release," while the "first-step release" still remains depressed.

In this so-called focus-lock state, the apparatus is standing by for the input of "second-step release." Also in this state, the AF steps have been completed, the objects are aimed at, and the moment of shooting is waited. Since this is considered the state awaiting the input of "second-step release," the release time lag is desired to be reduced as much as possible.

Therefore, several improved steps are adopted in the present invention, in which, for example, the time one second after depressing the "first-step release" is taken as the timing awaiting the moment of shooting, and the image-pickup apparatus is configured to set at that time the CCD bias voltage change by CPU 80 as the setting means.

In the case when the period for CCD bias voltage stabilization has elapsed before the exposure start after depressing "second-step release," the release time lag in proportion to the waiting time length can therefore be eliminated. In addition, the release time lag can be reduced even when the period for the stabilization has not elapsed.

In the fifth and eleventh embodiments, the image-pickup apparatus of the third embodiment is configured to suspend the setting of substrate bias voltage even after inputting the "first-step release", when the detection means detects a high-luminance object in the field of view to be photographed.

In the CCD I/F 41 as the "high-luminance object detection means," intensity data are computed from the data output from CCD 20 for respective portions over the display surface area subjected to the 256 segmentation, for example.

Utilizing the results acquired from the computation, AE operation is performed during the afore-noted monitoring. If a high-luminance object is present in the location corresponding to a certain segmented portion of the display surface, the intensity data for that portion should be large enough to evidence the existence of such high-luminance object.

Another case may be assumed in which a photographing timing is waited while aiming at a high-luminance object and which the object cannot be easily confirmed because of the blooming effect.

By setting the apparatus in such case to suspend an automatic setting of CCD bias voltage change, the occurrence of mistaken photographing decreases.

The setting for suspending the CCD bias voltage change during the state of exposure stand-by (focus-lock) may be configured to be performed either automatically upon detecting a high-luminance object, or alternatively by inputting through the operation unit 70 upon the input of the "first-step release." Further still, the setting of CCD bias voltage change may alternatively be configured to be suspended in the macro-mode imaging.

In the sixth and twelfth embodiments, the image-pickup apparatus of the fourth embodiment is configured to suspend when the low power consumption mode operation is set.

The switching to the low power consumption mode can be performed by the "low power mode setting means (not shown)" provided on the operation unit 70.

This switching may be performed not only by a setting by an operator but also by an automatic measure, for example, through detecting a lowered level of residual battery power or specifying the kind of battery and then deciding to automatically switch over internally to the low power mode.

The process steps set forth in the present description on the image-pickup apparatus may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium which is a computer readable medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Additional modifications and variations of the present invention are possible in light of the above teachings. It is therefore to be understood that within the scope of the appended claims, the invention may be practiced otherwise than as specifically described herein.

What is claimed is:

1. An image-pickup apparatus provided with an auto-focus capability, comprising:
   means for inputting a first trigger signal for initiating a distance measuring operation;
   means for inputting a second trigger signal for initiating a photographing operation; and
   means for setting a substrate bias voltage applied to an imaging device of the image-pickup apparatus;
   wherein the means for setting sets the substrate bias voltage after completion of an auto-focus scan of an auto-focus operation which determines a focus position, and while a focusing lens is being moved to the focus position which has been determined, when the second trigger signal is input before expiration of a predetermined period of time after inputting the first trigger signal.

2. An image-pickup apparatus provided with an auto-focus capability, comprising:
   means for inputting a first trigger signal for initiating a distance measuring operation;
   means for inputting a second trigger signal for initiating a photographing operation; and
   means for setting a substrate bias voltage applied to an imaging device included in the image-pickup apparatus;
   wherein the means for setting sets the substrate bias voltage at a time when a first predetermined period of time has passed after the input of the first trigger signal, in a case where the second trigger signal is not input during a predetermined period of time after inputting the first trigger signal.

3. The image-pickup apparatus according to claim 2, further comprising:
   means for detecting a high-luminance object in a scene to be photographed;
   wherein the means for setting suspends setting of the substrate bias voltage when the means for detecting detects the high-luminance object in the scene to be photographed even though the first predetermined time has passed after inputting to the means for inputting a first trigger signal.

4. A method of photographing images by an image-pickup apparatus provided with an auto-focus capability, comprising:
   receiving a first trigger signal for initiating a distance measuring operation;
   receiving a second trigger signal for initiating a photographing operation; and
   setting a substrate bias voltage applied to an imaging device of the image-pickup apparatus;
   wherein the substrate voltage is set after completion of an auto-focus scan of an auto-focus operation which determines a focus position, and while a focusing lens is being moved to the focus position which has been determined, when the second trigger signal is received prior to expiration of a predetermined period of time after receiving the first trigger signal.

5. A method of photographing images by an image-pickup apparatus provided with an auto-focus capability, comprising:
   receiving a first trigger signal for initiating a distance measuring operation;
   receiving a second trigger signal for initiating a photographing operation; and
   setting a substrate bias voltage applied to an imaging device included in the image-pickup apparatus;
   wherein the substrate bias voltage is set at a time when a first predetermined period of time has passed after receiving the first trigger signal, in a case where the second trigger signal is not received during a second predetermined period of time after receiving the first trigger signal.

6. The method according to claim 5, further comprising:

determining whether a high-luminance object is in a scene to be photographed;

wherein the substrate bias voltage is not set even though the first predetermined period of time has passed after receiving the first trigger signal, when the high-luminance object is determined to be in the scene to be photographed.

7. A computer-readable recording medium configured to be read by a machine, tangibly embodying a program of instructions executable by the machine for performing the method recited in one of claims 4, 5, and 6.

8. An image-pickup apparatus provided with an auto-focus capability, comprising:

a first unit configured to input a first trigger signal to initiate a distance measuring operation;

a second unit configured to input a second trigger signal to initiate a photographing operation; and a setting unit configured to set a substrate bias voltage applied to an imaging device included in the image-pickup apparatus;

wherein the setting unit is configured to set the substrate bias voltage after completion of an auto-focus scan of an auto-focus operation which determines a focus position, and while a focusing lens is being moved to the focus position which has been determined, when the second trigger signal is input before expiration of a predetermined period of time after inputting the first trigger signal.

9. An image-pickup apparatus provided with an auto-focus capability, comprising:

a first unit configured to input a first trigger signal to initiate a distance measuring operation;

a second unit configured to input a second trigger signal to initiate a photographing operation; and a setting unit configured to set a substrate bias voltage applied to an imaging device included in the image-pickup apparatus; wherein, wherein the setting unit is configured to set the substrate bias voltage at a time when a first predetermined period of time has passed after the input of the first trigger signal, in a case where the second trigger signal is not input during a second predetermined period of time after inputting the first trigger signal.

10. The image-pickup apparatus according to claim 9, further comprising:

a detection unit configured to detect a high-luminance object in a scene to be photographed;

wherein the setting unit is configured to suspend setting of the substrate bias voltage when the detection unit detects the high-luminance object in the scene to be photographed even though the first predetermined time has passed after inputting to the first unit.

* * * * *